(12) United States Patent
Jin et al.

(10) Patent No.: US 11,243,888 B2
(45) Date of Patent: Feb. 8, 2022

(54) DATA STORAGE APPARATUS AND OPERATING METHOD THEREOF

(71) Applicant: SK hynix Inc., Icheon (KR)

(72) Inventors: Yong Jin, Icheon (KR); Ki Sun Kim, Icheon (KR)

(73) Assignee: SK hynix Inc., Icheon (KR)

( * ) Notice: Subject to any disclaimer, the term of this patent is extended or adjusted under 35 U.S.C. 154(b) by 38 days.

(21) Appl. No.: 16/934,937

(22) Filed: Jul. 21, 2020

(65) Prior Publication Data

US 2021/0240627 A1 Aug. 5, 2021

(30) Foreign Application Priority Data

Feb. 5, 2020 (KR) .................. 10-2020-0013569

(51) Int. Cl.
*G06F 11/07* (2006.01)
*G06F 12/1009* (2016.01)
*G06F 12/0873* (2016.01)
*G06F 12/0891* (2016.01)
*G06F 12/02* (2006.01)
*G06F 11/30* (2006.01)
*G06F 13/16* (2006.01)
*G06F 11/10* (2006.01)

(52) U.S. Cl.
CPC ........ *G06F 12/0873* (2013.01); *G06F 11/076* (2013.01); *G06F 11/1016* (2013.01); *G06F 11/3037* (2013.01); *G06F 12/0292* (2013.01); *G06F 12/0891* (2013.01); *G06F 12/1009* (2013.01); *G06F 13/1673* (2013.01); *G06F 2212/7201* (2013.01); *G06F 2212/7207* (2013.01)

(58) Field of Classification Search
None
See application file for complete search history.

(56) References Cited

U.S. PATENT DOCUMENTS

2015/0199268 A1* 7/2015 Davis .................. G06F 12/0246
711/103

FOREIGN PATENT DOCUMENTS

KR 1020170048738 5/2017
KR 1020190032815 3/2019

\* cited by examiner

*Primary Examiner* — Charles J Choi

(57) ABSTRACT

A data storage apparatus includes storage divided into unit physical regions and having data stored therein, a buffer memory having buffer memory regions loaded with a map table comprising map data respectively indicating connection information between logical addresses of a host and start physical addresses for the unit physical regions, and a controller configured to: control data input and output to and from the storage according to a request of a host, to read, based on a map table address corresponding to a logical address included in the request, the map data for the logical address from the buffer memory, and to remap the map data by merging source map data of a buffer memory region having a number of errors equal to or greater than a threshold value with victim map data of a buffer memory region having a number of errors less than the threshold value.

18 Claims, 10 Drawing Sheets

DATA STORAGE APPARATUS AND OPERATING METHOD THEREOF

CROSS-REFERENCES TO RELATED APPLICATION

The present application claims priority under 35 U.S.C. § 119(a) to Korean application number 10-2020-0013569, filed on Feb. 5, 2020, in the Korean Intellectual Property Office, which is incorporated herein by reference in its entirety.

BACKGROUND

1. Technical Field

Various embodiments may generally relate to a semiconductor integrated device, and more particularly, to a data storage apparatus and an operating method thereof.

2. Related Art

A data storage apparatus may be coupled to a host to perform data input and output operations according to a request of the host.

The host may access data in the data storage apparatus using logical addresses that may be different from physical addresses used to actually access the data within the data storage device. Accordingly, to process a request from the host to the data storage apparatus, a management system may map a logical address used by the host to a physical address used by the data storage apparatus.

A map table may be used for the mapping between the logical and physical addresses and a stable operation of the map table may serve as a key factor in determining the reliability of a memory device.

SUMMARY

In an embodiment of the present disclosure, a data storage apparatus may include: storage which is divided into unit physical regions of a first size and data is stored therein; a buffer memory loaded with a map table which is a set of map data indicating connection information between a logical address of a host and a start physical address for the unit physical regions; and a controller configured to control data input and output to and from the storage according to a request of the host, read, based on a map table address in which map data for a logical address requested to be accessed by the host is stored, the map data from the buffer memory, and remap the map data by merging source map data of a buffer memory region in which a number of occurrences of errors is equal to or larger than a first threshold value with victim map data of at least one buffer memory region in which the number of occurrences of errors is less than the first threshold value.

In an embodiment of the present disclosure, an operating method of a data storage apparatus, which includes storage which is divided into unit physical regions of a first size and data is stored therein, a buffer memory loaded with a map table which is a set of map data indicating connection information between a logical address of a host and a start physical address for the unit physical regions, and a controller configured to control data input and output to and from the storage according to a request of the host, the method may include: as the request including the logical address is transmitted from the host, the controller, based on a map table address in which the map data for the logical address is stored, reading the map data from the buffer memory; and the controller, when a number of occurrences of errors of a buffer memory region in which the map data is stored is equal to or larger than a first threshold value, remapping the map data by merging source map data of the buffer memory region in which the number of occurrences of errors is equal to or larger than the first threshold value with victim map data of at least one buffer memory region in which the number of occurrences of errors is less than the first threshold value.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present teachings are described in detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to cross-section and/or plan illustrations of idealized embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
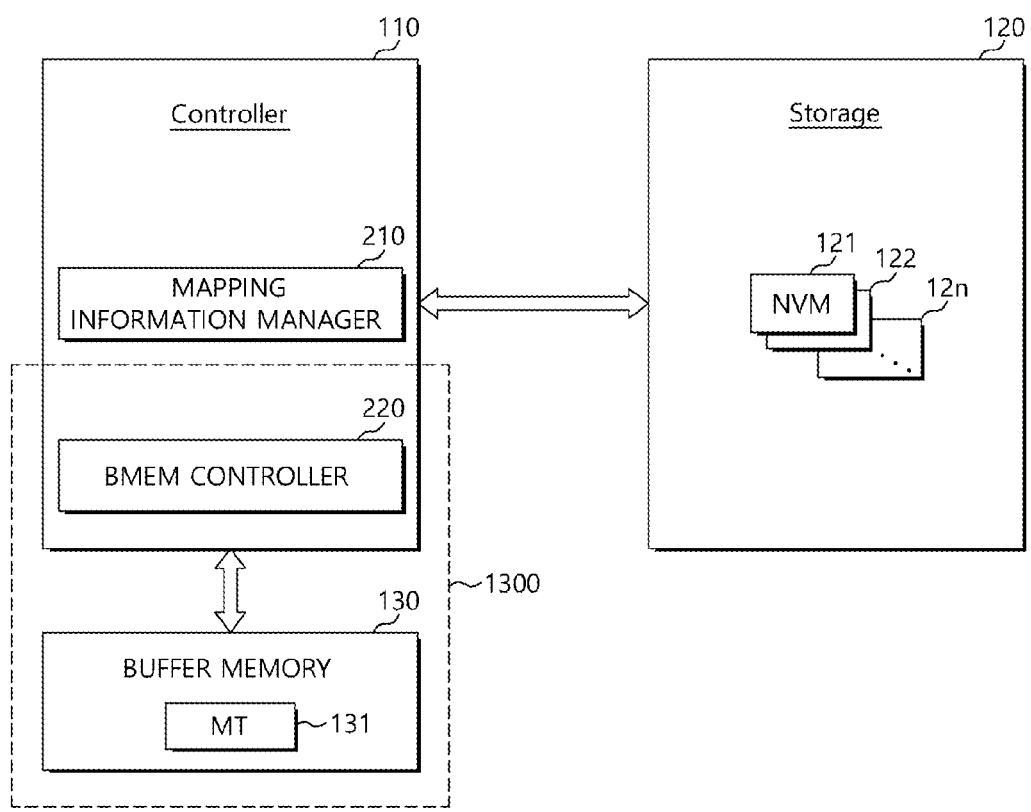
FIG. 1 illustrates a configuration of a data storage apparatus according to an embodiment of the present disclosure.

FIG. 1 is a diagram illustrating a configuration of a data storage apparatus 10 according to an embodiment.

The data storage apparatus 10 according to an embodiment may include a controller 110, storage 120, and a buffer memory 130.

The controller 110 may control the storage 120 in response to a request of a host. For example, the controller 110 may control the data to be programmed in the storage 120 according to a program (write) request of the host. The controller 110 may provide data stored in the storage 120 to the host in response to a read request of the host. In an embodiment, the controller 110 may include a mapping information manager 210 and a buffer memory (BMEM) controller 220.

The storage 120 may store data or output stored data, according to control of the controller 110. The storage 120 may be configured of a volatile memory or a nonvolatile memory. In an embodiment, the storage 120 may be implemented using a memory device selected among various nonvolatile memory devices such as an electrically erasable and programmable read only memory (EEPROM), a NAND flash memory, a NOR flash memory, a phase-change random access memory (PRAM), a resistive RAM (ReRAM), a ferroelectric RAM (FRAM), and a spin torque transfer magnetic RAM (STT-MRAM).

The storage 120 may include a plurality of nonvolatile memory devices (NVMs) 121 to 12n and each of the nonvolatile memory devices (NVMs) 121 to 12n may include a plurality of dies, a plurality of chips, or a plurality of packages. Further, the storage 120 may be configured of a single-level cell (SLC) in which one-bit (1-bit) data is to be stored in one memory cell or a multi-level cell (MLC) in which multi-bit data (that is, two or more bits of data) is to be stored in one memory cell.

A memory device which cannot be updated in place (overwritten) like a flash memory device may first perform an erase operation on a program-target memory cell and then perform a program operation on the program-target memory cell. A write/read unit (page unit) and an erase unit (block unit) in the flash memory device may be different from each other. Accordingly, to update a portion of data stored in a specific block, the flash memory device may update the partial data by reading the entirety of data stored in the corresponding specific block and programming the entirety of the data (after being updated if necessary) in another block.

As the physical position in which data is stored may be changed without the knowledge of the host, the map table, which manages the association of the logical address used by the host with the physical address of the storage 120, may be used.

The mapping information manager 210 of the controller 110 may perform a management operation, such as an operation of generating and updating a map table MT in which the logical address of the host is associated with the physical address of the storage 120. The map table MT may be stored in the storage 120 and may be loaded into the buffer memory 130 when power is supplied to the data storage apparatus 10. The map table MT may be a set of entries (or segments) which are unit map data for storing mapping information of the physical address for the logical address and a size of the map table MT may be proportional to a capacity of the storage 120.

In an embodiment, the logical address may refer to a start physical address for a unit physical region of a first size (for example, 4 kilobytes (KB)) of a memory device constituting the storage 120, and the map data may include data in which an address of a physical region corresponding to the logical address is represented by a second size (for example, 4 bytes).

The buffer memory 130 may serve as a space in which data required when the data storage apparatus 10 performs a series of operations of writing and reading data in conjunction with the host. For example, a map table which is a set of map data, data to be read, data to be written, metadata, and the like may be temporarily stored in the buffer memory 130.

In an embodiment, the buffer memory 130 may be configured of a dynamic random access memory (DRAM) and/or a static random access memory (SRAM) and may be controlled through the BMEM controller 220.

The BMEM controller 220 may divide the buffer memory 130 into a plurality of regions (slots) and allocate or release the regions to temporarily store data. The phrase "allocation of the region" may mean configuring a corresponding region to have a state that data is stored in the corresponding region or a state that the data stored in the corresponding region is valid. The phrase "release of the region" may mean configuring a corresponding region to have a state that data is not stored in the corresponding region or a state that the data stored in the corresponding region is invalidated.

DRAMs have been widely used as working memories of computing devices due to fast operation speed and high integration degree as compared with flash memories. However, because DRAMs have finite data retention characteristics, DRAMs need to periodically perform refresh. To ensure reliability of DRAMs which store key data such as a map table, the BMEM controller 220 may perform an error correction operation when reading or refreshing data of the buffer memory 130. In an embodiment, the BMEM controller 220 may correct a 1-bit error of the buffer memory 130 and detect a 2-bit error of the buffer memory 130.

When the 1-bit error repeatedly occurs in a specific region of the buffer memory 130, the probability that an uncorrectable error occurs in the corresponding specific region in the future may be high and thus performing error management may be required.

For convenience of description, key terms to be described later will be defined as follows.

TABLE 1

| Terms | Definitions |
| --- | --- |
| Map data region | Buffer memory 130 region in which a mapping between a physical address of storage 120 and a logical address is stored |
| Map table address | Address of map data region of buffer memory 130 |
| Source map data | Map data of error occurrence map data region |
| victim map data | Map data to be merged with source map data |
| Merged logical address | Logical address of map data merged with error occurrence map data which is consecutive to logical address of error occurrence map data, or logical address of victim map data |

TABLE 1-continued

| Terms | Definitions |
| --- | --- |
| Merged map data | Map data in which the source map data and the victim map data are merged. |
| Source physical address | Physical address of storage indicated by source map data. |
| victim physical address | Physical address of storage indicated by victim map data. |

The mapping information manager 210 may generate a "map table address" which is an address of a "map data region" within the buffer memory 130 in which map data for a logical address provided from a host is stored, and may acquire map data including a physical address of the storage 120 by accessing the region within the buffer memory 130 indicated by the map table address.

In an embodiment, the mapping information manager 210 may receive error-related information of the map data region when reading the map data from the buffer memory 130. The error-related information may include error occurrence/non-occurrence, the number of occurrences of errors, and an error occurrence position (such as a column address).

The mapping information manager 210 may count the number of occurrences of errors for each map data region and generate merged map data by merging source map data, which is map data of a map data region in which the number of occurrences of errors is equal to or larger than a set threshold value (first threshold value), with victim map data which is at least one piece of another map data. In an embodiment, the mapping information manager 210 may merge the source map data and the victim map data by selecting map data for at least one logical address consecutive to a logical address of the error occurrence map data region as the victim map data and manage the logical address of the selected map data as the "merged logical address". In an embodiment, the merged logical address may be a logical address of the victim map data, but embodiments are not limited thereto. Further, the error occurrence map data region may be marked as a bad state and prevented from being accessed from that time on, and thus the occurrence of the uncorrectable error may be prevented.

The merged map data may be map data for a physical region having a size X (where X equals the number of merged map data) times the first size K. For example, when one logical address is mapped to a start physical address for a 4 KB unit physical region and one piece of source map data is merged with one piece of victim map data, the merged map data may be mapping data of a start physical address for an 8 KB unit physical region and a merged logical address.

The operation of merging map data to be described later may be a process of moving data of a physical region indicated by the source map data and data of a physical region indicated by the victim map data to target regions of the storage 120 which are physically continuous, and mapping the merged logical address and a start physical address of the target regions.

With respect to each of the map data regions, the merged state of the map data may be managed as meta information for the map table address. In an embodiment, the meta information may be information representing whether the map data are merged, whether the source map data is merged with map data of a preceding logical address of logical addresses consecutive to the source map data, or whether the source map data is merged with map data of a following logical address of the logical addresses consecutive to the source map data. The meta information may be stored as a bitmap.

When a logical address is provided from a host, the mapping information manager 210 may determine a map table address in which map data for the logical address is stored and determine the merged state of the map data based on meta information corresponding to the map table address. When the map data of the extracted map table address is merged with the map data of the preceding or following logical address, the mapping information manager 210 may acquire the physical address to be accessed from the merged map data.

The embodiment of merging map data as described above may change mapping information of map data for a buffer memory 130 region in which an error occurs and thus may be referred to as soft remapping.

In an embodiment, when a count of the number of occurrences of errors of a specific column in the buffer memory 130 is above a set threshold value (second threshold value) based on an error occurrence position, the mapping information manager 210 may control the BMEM controller 220 to move data of the corresponding column to a spare region (a redundancy column) of the buffer memory 130. When the data of the error occurrence column is moved to the redundancy column, the BMEM controller 230 may remap the column address in the map table address according to the error occurrence column address and the redundancy column address to which the data of the error occurrence column is moved. When the mapping information manager 210 accesses the map table of the buffer memory 130, the BMEM controller 220 may control the mapping information manager 120 to access the buffer memory 130 based on column address remapping information.

The embodiment that changes the map data storage position on a column basis as described above may correct an error by moving the data of the error occurrence region of the buffer memory 130 to a non-error occurrence region and thus may be referred to as hard remapping.

In an embodiment, while performing the soft remapping, the controller 110 may perform the hard remapping when a failure is detected in a specific column, but embodiments are not limited thereto. In embodiments, the controller 110 may determine whether to perform the hard remapping after performing the soft remapping or may determine whether to perform the soft remapping after performing the hard remapping. In other embodiments, the controller 110 may alternate between performing the soft remapping and performing the hard remapping.

The order of performance of the soft remapping and the hard remapping does not need to be prescribed and may be variously changed in various embodiments. For example, the soft remapping and the hard remapping may be performed in parallel or may be alternately performed.

Although FIG. 1 shows an example wherein the buffer memory 130 is located outside of the controller 110, in embodiments the buffer memory 130 may be provided inside of the controller 110. In embodiments, the BMEM controller 220 may be provided in the controller 110 as shown in FIG. 1 or may be packaged with the buffer memory 130 to constitute a buffer memory device 1300.

Figure 2:
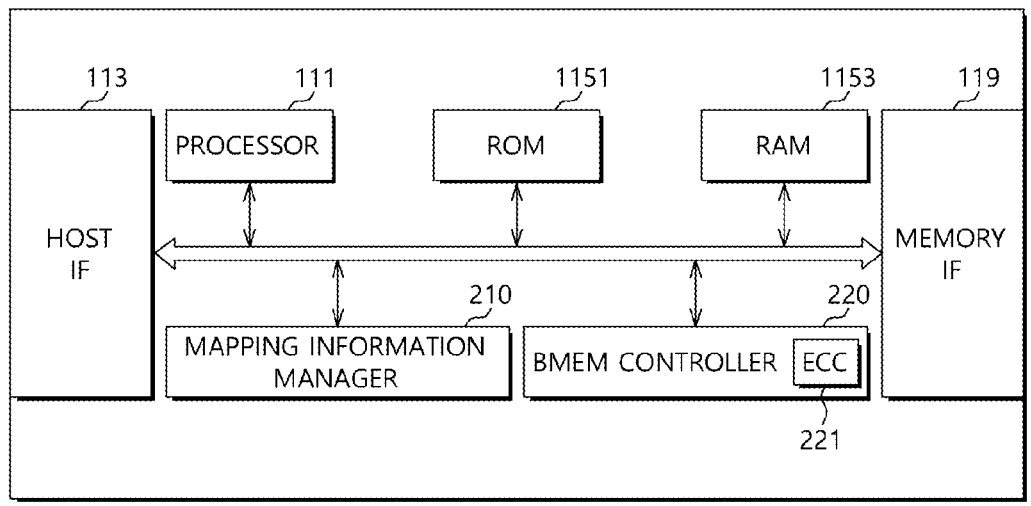
FIG. 2 illustrates a configuration of a controller according to an embodiment of the present disclosure.

FIG. 2 is a diagram illustrating a configuration of a controller 110 according to an embodiment.

The controller 110 according to an embodiment may include a processor 111, a host interface 113, a read only memory (ROM) 1151, a random access memory (RAM)

1153, a memory interface 119, the mapping information manager 210, and the BMEM controller 220.

The processor 111 may be configured to transmit various control information required for a read or write operation of data with respect to the storage 120 of FIG. 1 to the host interface 113, the RAM 1153, the memory interface 119, the mapping information manager 210, and the BMEM controller 220. In an embodiment, the processor 111 may operate according to firmware provided for various operations of the data storage apparatus 10. In an embodiment, the processor 111 may perform a function of a flash translation layer (FTL) for performing garbage collection, address mapping, wear leveling, and the like to manage the storage 120, a function of detecting an error of data read from the storage 120 and performing error check and correction (ECC) on the detected error, and the like.

When a write command and a logical address are received from the host, the processor 111 may control a write operation which allocates a physical address corresponding to the logical address and writes data in a storage region of the storage 120 corresponding to the physical address.

When a read command and a logical address are received from the host, the processor 111 may control a read operation which determines a physical address corresponding to the logical address and reads data from a storage region of the storage 120 corresponding to the physical address.

The host interface 113 may receive a command and a clock signal from the host according to control of the processor 111 and provide a communication channel for controlling data input and output. In particular, the host interface 113 may provide a physical connection between the host and the data storage apparatus 10. The host interface 113 may provide interfacing between the data storage apparatus 10 and the host according to a bus format of the host. The bus format of the host may include at least one among standard interface protocols such as a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI-express (PCI-E) protocol, and a universal flash storage (UFS) protocol.

Program codes, for example, firmware or software required for an operation of the controller 110 may be stored in the ROM 1151 and code data and the like used by the program codes may be stored in the ROM 1151.

Data required for an operation of the controller 110 may be stored in the RAM 1153 and data generated through operation of the controller 110 may be stored in the RAM 1153.

The memory interface 119 may provide a communication channel for signal transmission and reception between the controller 110 and the storage 120. The memory interface 119 may write data temporarily stored in the buffer memory 130 in the storage 120 according to control of the processor 111. The memory interface 119 may temporarily store data read out from the storage 120 in the buffer memory 130.

The mapping information manager 210 may be configured to control the soft remapping operation, the hard remapping operation, or both by collecting error-related information of a map data region loaded with map data when acquiring a physical address from the buffer memory 130 based on a logical address provided with a command of the host. The error-related information may include, for example, error occurrence/non-occurrence, the number of occurrences of errors, or an error occurrence position (such as a column address).

The BMEM controller 220 may be configured to manage a usage state of the buffer memory 130. In an embodiment, the BMEM controller 220 may divide the buffer memory 130 into a plurality of regions (slots) and allocate or release the regions to temporarily store data.

The BMEM controller 220 may include an ECC circuit 221 configured to correct a 1-bit error in data read from the buffer memory 130 and detect a 2-bit error in data read from the buffer memory 130.

For the soft remapping (first remapping), when the number of occurrences of errors of a map data region accessed to acquire a physical address based on the logical address included in the request of the host is equal to or greater than a first threshold value, the mapping information manager 210 may designate corresponding map data as the source map data. The mapping information manager 210 may merge victim map data for at least one logical address consecutive to the logical address of the source map data with the source map data and manage the at least one logical address as a merged logical address. The merged logical address may be a logical address of any one piece of victim map data out of the victim map data, for example, any one logical address out of one or more logical addresses of the victim map data. The mapping information manager 210 may change meta information for an error occurrence map table address based on the map data merged state. When data corresponding to the source physical address and data corresponding to the victim physical address are not stored contiguously on the storage 120, the mapping information manager 210 may move the data corresponding to the source physical address and the data corresponding to the victim physical address to target regions of the storage 120 which target regions are physically contiguous to each other, and then map a physical address of the target regions with the merged logical address.

For the hard remapping (second remapping), when the number of occurrences of errors for a specific column of a map data region is equal to or greater than a second threshold value, the mapping information manager 210 may control the BMEM controller 220 to move data of the specific column where the error occurred to a redundancy column. For the second remapping operation, the BMEM controller 220 may move the data of the error occurrence column to the redundancy column and manage the remapping information of the corresponding column address.

Figure 3:
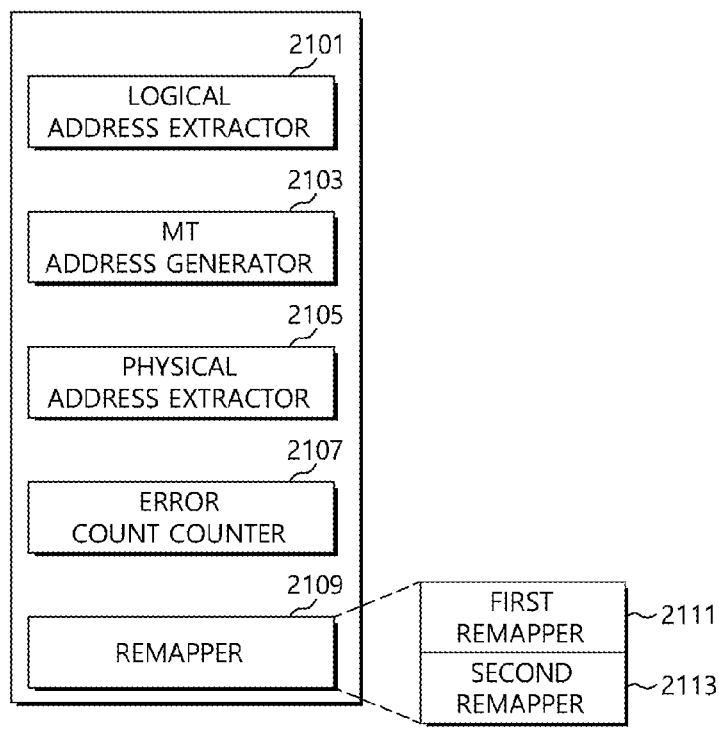
FIG. 3 illustrates a configuration of a mapping information manager according to an embodiment of the present disclosure.
Figure 4:
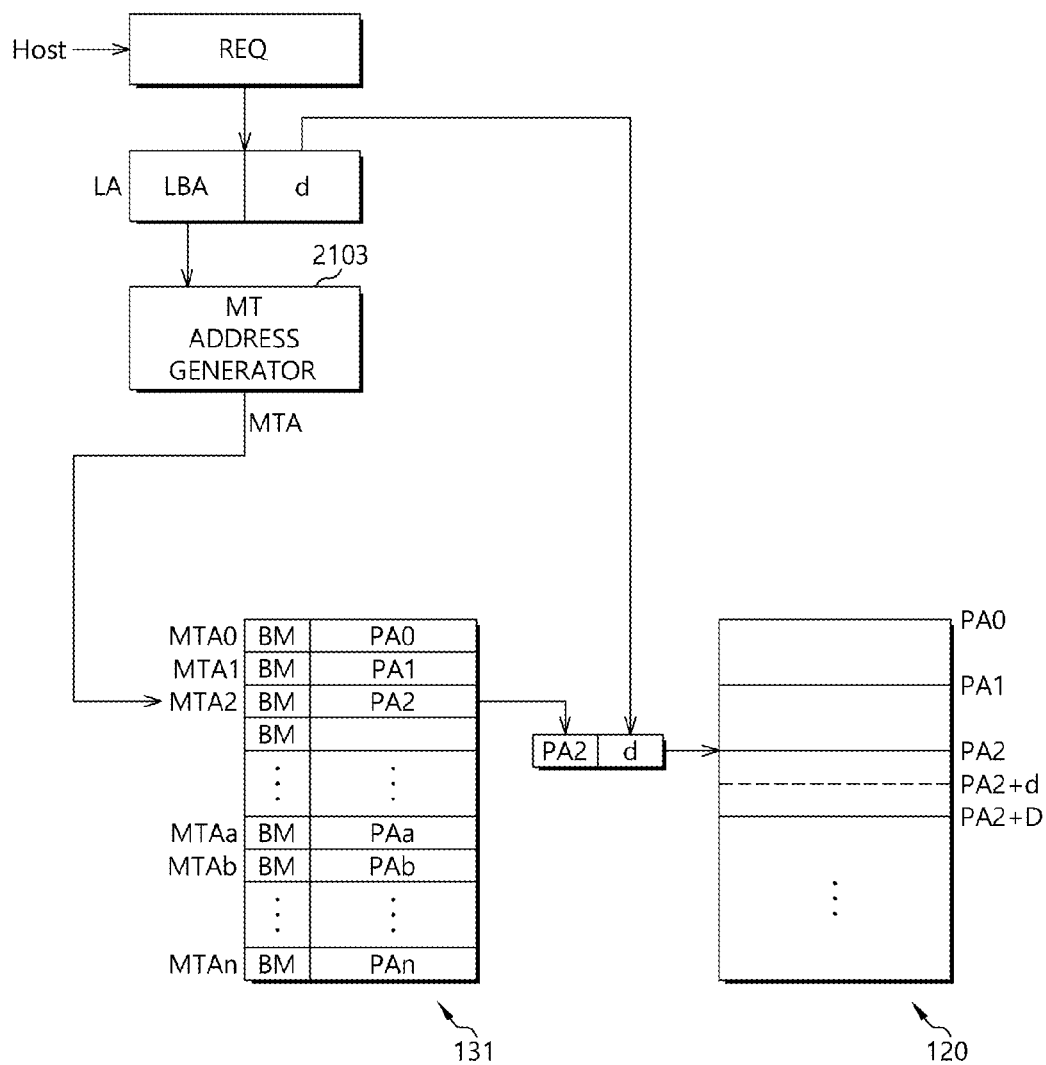
FIG. 4 illustrates a mapping information management concept according to an embodiment of the present disclosure.

FIG. 3 is a diagram illustrating a configuration of a mapping information manager 210 according to an embodiment and FIG. 4 is a diagram explaining a mapping information management concept according to an embodiment.

The mapping information manager 210 may include a logical address extractor 2101, a map table (MT) address generator 2103, a physical address extractor 2105, an error count counter 2107, and a remapper 2109. The remapper 2109 may include a first remapper 2111 and a second remapper 2113.

Referring to FIGS. 3 and 4, the logical address extractor 2101 may be configured to extract a logical address LA from a request REG of the host. The request REQ of the host may include a command (read, write, and the like) and the logical address LA, and the logical address extractor 2101 may extract the logical address from the request REQ of the host. In an embodiment, the logical address LA may include a logical block address LBA and an offset d.

The map table (MT) address generator 2103 may determine a map table address MTA allocated to the logical block address LBA extracted by the logical address extractor 2101. For example, the map table address MTA may be determined by adding a base address of the map table MT to an offset determined using the logical block address LBA, but embodiments are not limited thereto. The map table address MTA may be an access address to the buffer memory 130, shown in FIG. 1, in which the map table MT is stored.

The physical address extractor 2105 may acquire a physical address PA from a buffer memory 130 region indicated by the map table address MTA extracted through the map table (MT) address generator 2103. In an embodiment, the physical address extractor 2105 may receive error-related information of a map data region loaded with the corresponding map data when acquiring the physical address PA from the buffer memory 130, for example, error occurrence/non-occurrence, the number of occurrences of errors, and an error occurrence position (e.g., a column address).

The error count counter 2107 may count the number of occurrences of errors of the map data region by receiving the error-related information from the physical address extractor 2105 and determine whether to perform map data remapping by counting the number of occurrences of errors for each error occurrence position of the map data region.

As the physical address PA is acquired, the controller 110 may access the storage 120 to process the command of the host based on the physical address PA extracted through the physical address extractor 2105 and the offset d extracted through the logical address extractor 2101.

When a counting result of the error count counter 2107 indicates that remapping is required, the remapper 2109 may perform the soft remapping through the first remapper 2111, may perform the hard remapping through the second remapper 2113, or both.

Figure 5:
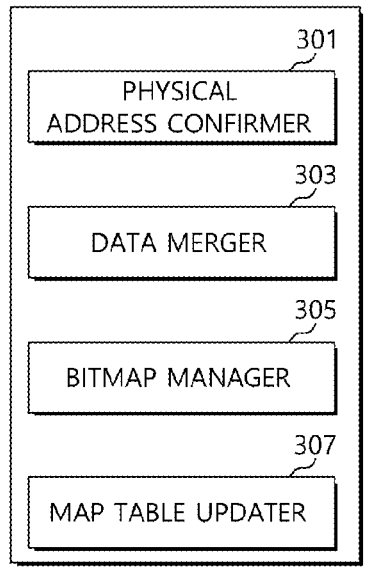
FIG. 5 illustrates a configuration of a first remapper according to an embodiment of the present disclosure.

FIG. 5 is a diagram illustrating a configuration of a first remapper 2111 according to an embodiment.

The first remapper 2111 may include a physical address confirmer 301, a data merger 303, a bitmap manager 205, and a map table updater 307, and may perform the soft remapping.

The physical address confirmer 301 may select map data for at least one logical address consecutive to the logical address of the source map data stored in the error occurrence map data region as the victim map data. The physical address confirmer 301 may determine whether the region of the storage 120 corresponding to the source physical address indicated by the source map data and the region of the storage 120 corresponding to the victim physical address to be merged to the source physical address are contiguous.

When the regions of the storage 120 corresponding to the source physical address and the victim physical address are not contiguous, the data merger 303 may move data of a region indicated by the source physical address and data of a region indicated by the victim physical address to target regions of the storage 120 which are physically contiguous.

In an embodiment, the data merging process within the storage 120 may be omitted when the regions of the storage 120 corresponding to the source physical address and the victim physical address are contiguous.

The bitmap manager 305 may manage the meta information indicating a merged state of each map data according to a map table address. In an embodiment, the bitmap manager 305 may manage indications of whether the map data are merged, whether the source map data is merged with the victim map data of a preceding logical address consecutive to the logical address of the source map data, and/or whether the source map data is merged with the victim map data of a following logical address consecutive to the logical address of the source map data, as the bitmap information corresponding to the map table address. The meta information for the map table address may be stored in a region selected among a working memory of the controller 110, a meta information storage space of the buffer memory 130, and other storage spaces.

The map table updater 307 may assign the merged logical address to the merged map data as the source map data is merged with the victim map data. In an embodiment, the merged logical address may be a logical address of any one piece of victim map data out of the victim map data. Specifically, the merged logical address may be a logical address of victim map data which is the most preceding (e.g., having the lowest value) logical address out of the victim map data, for example, the most preceding logical address out of the plurality of logical addresses corresponding to the victim map data, but embodiments are not limited thereto. When the physical address of the source map data is not consecutive to the physical address of the victim map data and thus the data merging is performed within the storage 120, the map table updater 307 may map the merged logical address of the merged map data to a start physical address of the target regions.

Accordingly, the physical address to be accessed in the storage 120 may be acquired from the original map data or the merged map data after the merged state of the map data of the map table address is determined based on the meta information corresponding to the map table address acquired from the logical address provided from the host.

Figure 6:
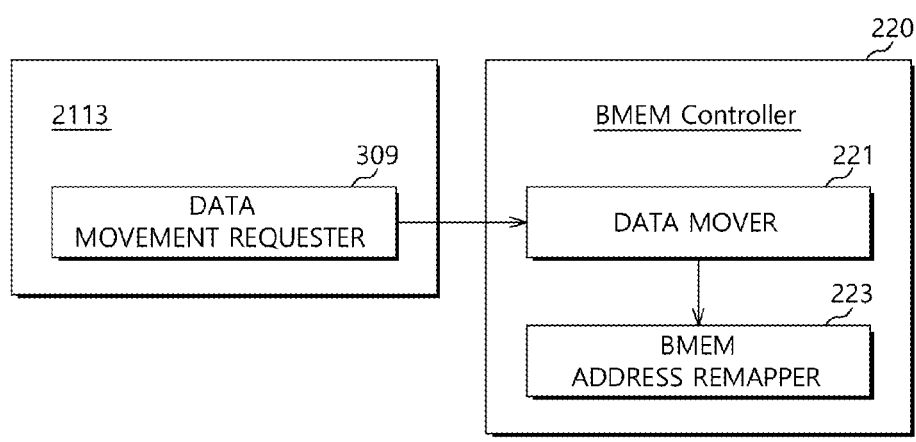
FIG. 6 illustrates a configuration of a second remapper and a buffer memory controller according to an embodiment of the present disclosure.

FIG. 6 is a diagram illustrating a configuration of a second remapper 2113 and a BMEM controller according to an embodiment.

The second remapper 2113 may include a data movement requester 309. The BMEM controller 220 may include a data mover 221 and a buffer memory (BMEM) address remapper 223.

When it is determined, based on counting the number of occurrences of errors for each error occurrence position (column) of the map data region using the error count counter 2107, that the map data remapping is required, the data movement requester 309 may control the BMEM controller 220 to move data of the column corresponding to the error occurrence position to a spare region (redundancy region) of the buffer memory 130.

The data mover 221 may move the data of the error occurrence column to the redundancy column according to control of the data movement requester 309.

The BMEM address remapper 223 may remap the map table address, substantially, the column address within the map table address based on the error occurrence column address and the redundancy column address to which the data of the error occurrence column is moved.

Accordingly, when the mapping information manager 210 accesses the map table of the buffer memory 130 based on the map table address, the BMEM controller 220 may control an access position to the buffer memory 130 based on the column address remapping information. In an embodiment, a column may correspond to a bit line of a memory array, and a redundancy column may correspond to a redundant bit line provided in the memory array for use in replacing defective bit lines.

Figure 7:
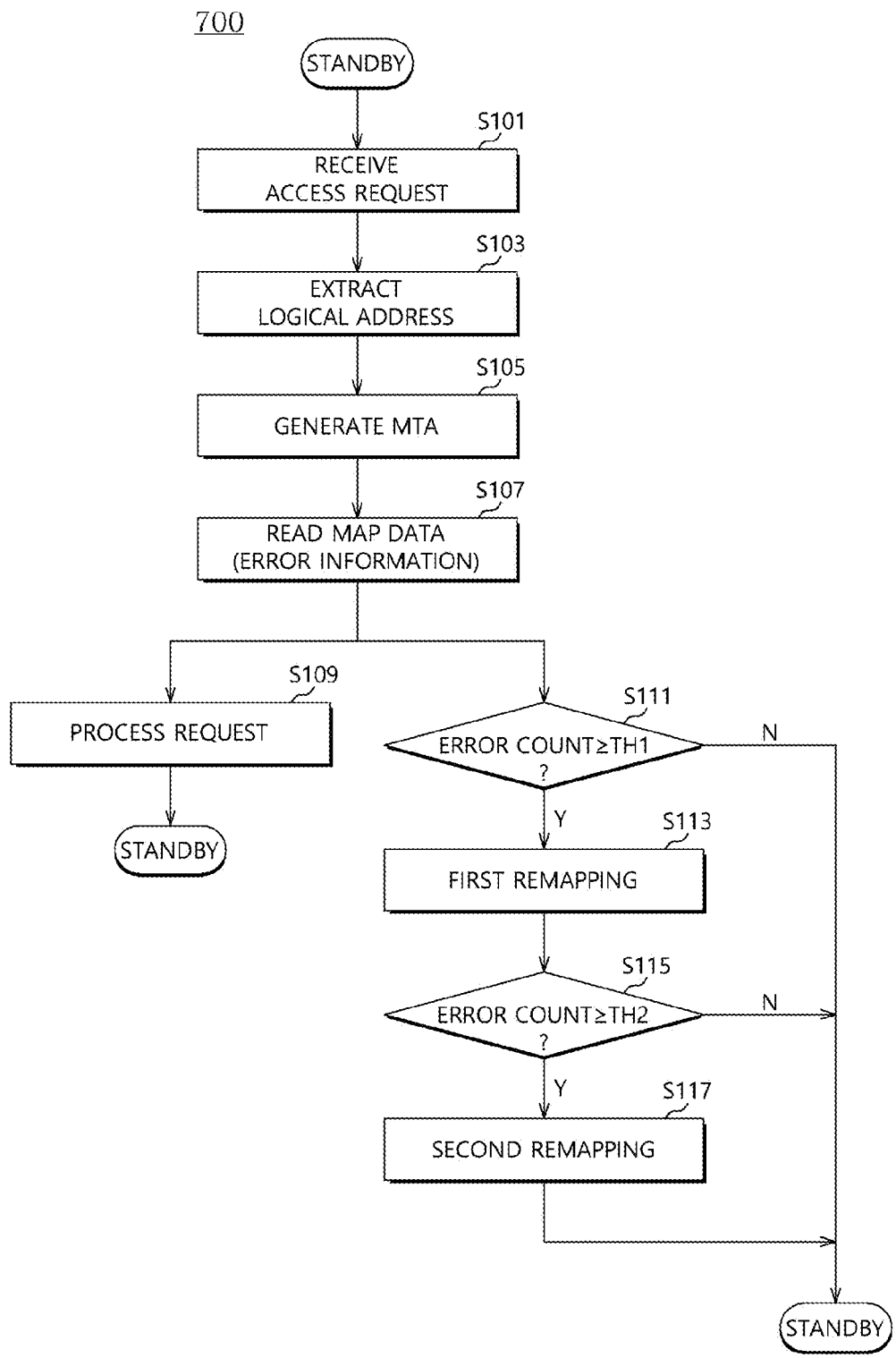
FIG. 7 illustrates an operating process of a data storage apparatus according to an embodiment of the present disclosure.

FIG. 7 is a flowchart explaining an operating process 700 of a data storage apparatus, such as the data storage apparatus 10 of FIG. 1, according to an embodiment.

The data storage apparatus 10 may receive the access request REQ of the host during standby (as shown in FIG. 7) or during an operation (S101).

The controller 110 may extract the logical address LA from the request REQ of the host (S103).

In an embodiment, the request REQ of the host may include a command and the logical address LA and the controller 110 may extract the logical address LA including a logical block address LBA and the offset d from the request REQ of the host.

The controller 110 may determine the map table address MTA allocated to the extracted logical address, specifically, to the logical block address LBA (S105), and acquire the physical address PA from a buffer memory 130 region indicating by the determined map table address MTA (S107). The controller 110 may receive error-related information of a map data region loaded with corresponding map data when acquiring the physical address PA from the buffer memory 130, for example, error occurrence/non-occurrence, the number of occurrences of errors, and an error occurrence position (e.g., a column address). After performing the operation S107, the process 700 may perform both operations S109 and S111.

As the physical address PA is acquired, the controller 110 may access the storage 120 corresponding to the acquired physical address PA to process the command of the host (S109).

The controller 110 may determine whether to perform map data remapping by counting the number of occurrences of errors for the map data region and/or the number of occurrences of errors for each error occurrence position (that is, each column) of the map data region.

In an embodiment, the controller 110 may determine whether the number of occurrences of errors is equal to or greater than the set first threshold value TH1 (S111).

In response to determining that the number of occurrences of errors (error count) is equal to or greater than the first threshold value TH1 as a determination result of operation S111 (S111: Y), the controller 110 may perform first remapping, for example, soft remapping which generates merged map data by merging source map data, which is map data of the map data region corresponding to the error count, with victim map data which is at least one piece of another map data in which the number of occurrences of errors is less than the first threshold value (S113).

The controller 110 may determine whether the number of occurrences of errors (error count) for each error occurrence position (column) of the map data region is equal to or greater than the second threshold value TH2 (S115).

In response to determining that the number of occurrences of errors of a specific column is equal to or greater than the second threshold value TH2 as a determination result of operation S115 (S115: Y), the controller 110 may move data of the corresponding column to a redundancy column and perform second remapping, for example, hard remapping which remaps the column address (S117).

After operation S109 of processing the request of the host, when it is determined that the number of occurrences of errors is less than the first threshold value TH1 as the determination result of operation S111 (S111: N) or when it is determined that the number of occurrences of errors for the column is less than the second threshold value TH2 as the determination result of operation S115 (S115: N), the controller 110 may proceed to a standby state.

In an embodiment, the performing order of the first remapping process performed based on the first threshold value TH1 and the hard remapping process performed based on the second threshold value TH2 does not need to be prescribed. The performing order of the soft remapping and the hard remapping may be changed in various embodiments. For example, the soft remapping and the hard remapping may be performed in parallel or may be alternately performed.

Figure 8:
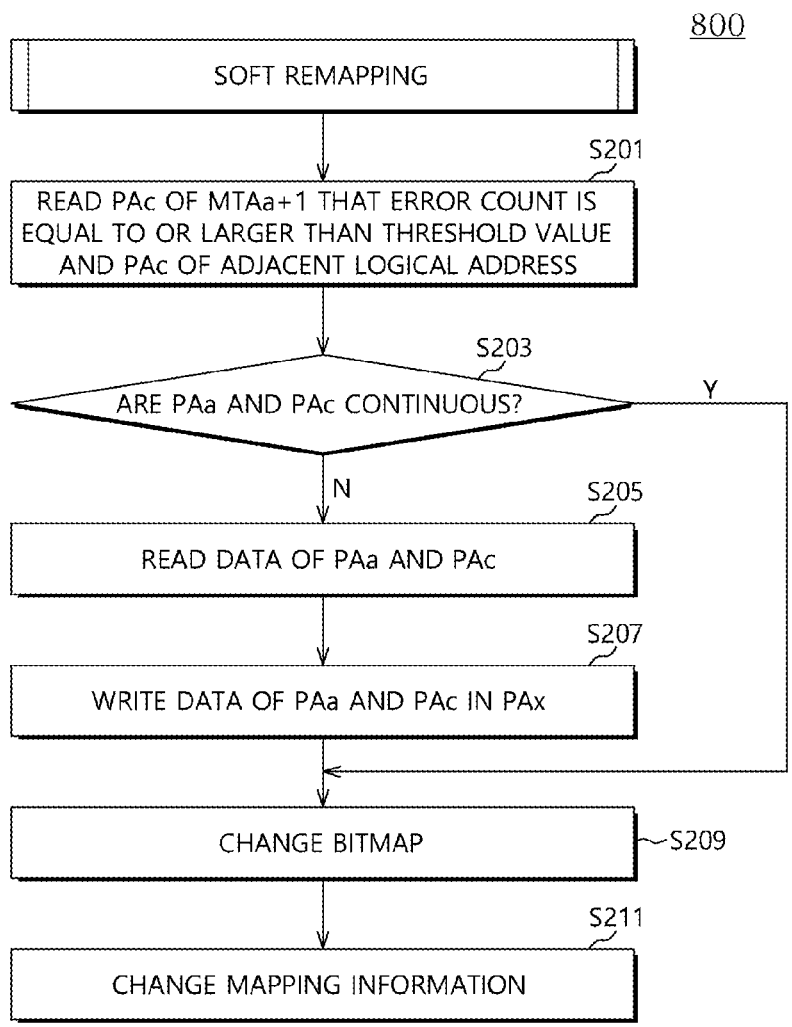
FIG. 8 illustrates a soft remapping process according to an embodiment of the present disclosure.
Figure 9:
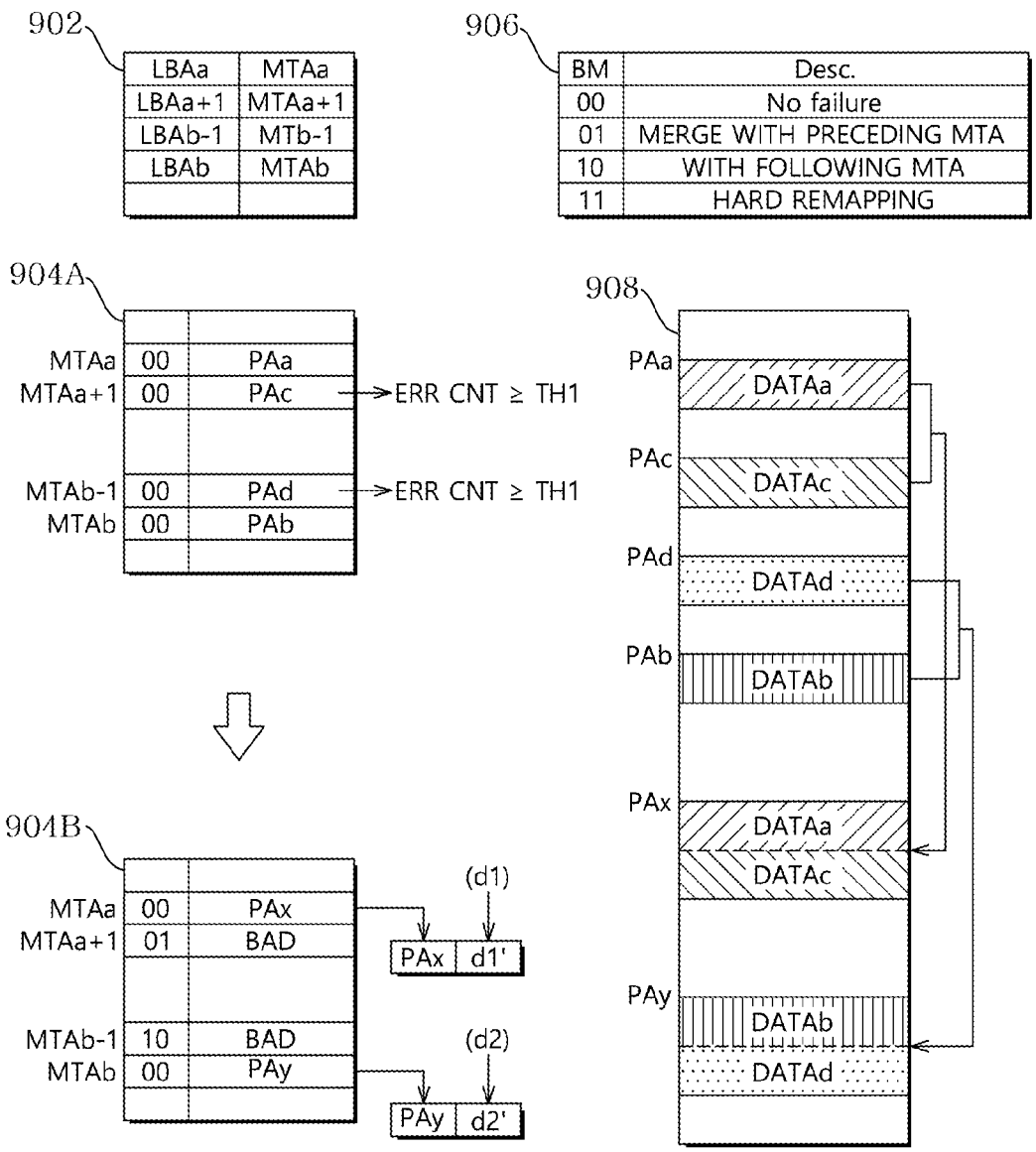
FIG. 9 illustrates components used by a soft remapping process according to an embodiment of the present disclosure.

FIG. 8 is a flowchart explaining a soft remapping process 800 according to an embodiment and FIG. 9 illustrates actual and conceptual data structures related to the soft remapping process according to an embodiment. FIG. 9 includes a table 902 showing Logical Block Address (LBA) to Map Table Address (MTA) mappings, an initial map table 904A before operation of a soft remapping process (which map table may be stored in the buffer memory 130 and also includes meta information), a resulting map table 904B after operation of the soft remapping process, a table 906 showing interpretations of meta information bitmaps (BM), and a memory map 908 showing relative locations of regions within the storage 120 that are indicated by physical addresses.

Referring to FIGS. 8 and 9, an example in which the map table address MTA for a logical address is allocated as illustrated in table 902 and the meta information BM and the physical address PA for a map table address MTA region are initially stored as illustrated in the initial map table 904A will be illustratively explained.

In an embodiment, when the number of occurrences of errors of a map table address (MTAa+1) region allocated to a logical address LBAa+1 of the host is equal to or greater than the first threshold value TH1, the controller 110 may select map data for the at least one logical address LBAa consecutive to the logical address LBAa+1 of the source map data stored in map data region MTAa+1 in which the error(s) occurred as the victim map data, and may read out a source physical address PAc (from map data region MTAa+1) and a victim physical address PAa (from map data region MTAa) to be merged with the source physical address PAc (S201), and may determine whether the source physical address PAc and the victim physical address PAa to be merged respectively correspond to contiguous regions within storage 120 (S203).

In response to determining that the region of storage 120 corresponding to the source physical address PAc and the region of storage 120 corresponding to the victim physical address PAa are not contiguous, as illustrated in memory map 908 (S203: N), the controller 110 may read out data DATAc of the region indicated by the source physical address PAc and read out data DATAa of the region indicated by the victim physical address PAa (S205) and move the data DATAa and DATAc to target regions beginning at physical address PAx of the storage 120, which target regions are physically continuous to each other (S207).

In an embodiment, when it is determined that the regions the within storage 120 respectively corresponding to the source physical address and the victim physical address are contiguous (S203: Y), the data merging process S205 and S207 within the storage 120 may be omitted.

As the map data are merged, the controller 110 may change meta information indicating the merged state of the corresponding map data as illustrated in resulting map table 904B (S209) and change mapping information (S211).

In the meta information (BM) table as illustrated in table 906, the meta information "00" may indicate a state that no error occurs and the meta information "11" may indicate a state that the hard remapping is performed. The meta information "01" may indicate a state that the source map data is merged with map data of a preceding logical address and the meta information "10" may indicate a state that the source map data is merged with map data of a following logical address.

The controller 110 may change mapping information by assigning the merged logical address to the merged map data (S211). For example, when the regions of storage 120 respectively corresponding to the physical address of the source map data and the physical address of the victim map data are not contiguous and thus the data merging is performed within the storage 120, the controller 110 may map the merged logical address of the merged map data and the physical address of the target region, as shown in the resulting map table 904B, wherein map table address MTAa is now mapped to physical address PAx. When the regions of storage 120 respectively corresponding to the physical address of the source map data and the physical address of the victim map data are contiguous and thus the data merging is not necessary, the merged map data may be the same as the victim map data; that is, if the region of storage 120 corresponding to the source physical address PAc and the region of storage 120 corresponding to the victim physical address PAa had been contiguous, then in the resulting map table 904B map table address MTAa would still be mapped to physical address PAa instead of physical address PAx.

In an embodiment, because the source map data of the logical address LBAa+1 is merged with the map data of the preceding logical address LBAa precedent to the logical address LBAa+1 in the resulting map table 904B, the meta information for the map table address MTAa+1 in which an error above the first threshold value had occurred may be set to, for example, "01".

As the map data are merged, the merged logical address of the logical addresses LBAa and LBAa+1 may be set to the victim logical address LBAa. Then, when an access request to the logical address LBAa+1 is received, the controller 110 may acquire the physical address PAx from a region of the resulting map table 904B indicated by the map table address MTAa allocated to the merged logical address LBAa based on the meta information "01" of the map table address MTAa+1 and access a corresponding region of the storage 120 by converting an offset d1 included in the logical address of the host into d1'. For example, in an embodiment the controller 110 may determine the map table address MTAa+1 from the logical address LBAa+1, determine from the meta-information corresponding to the map table address MTAa+1 that the region of the resulting map table 904B corresponding to the map table address MTAa+1 has been merged into the region of the resulting map table 904B indicated by the map table address MTAa (that is, the preceding region), acquire a merged physical address PAx from the region of the resulting map table 904B indicated by the map table address MTAa, and determine the physical address corresponding to the logical address LBAa+1 by adding an offset d1' derived from an offset d1 associated with the logical address LBAa+1 to the merged physical address PAx.

When the source map data is merged with the map data of the preceding logical address and the host requests an access to the logical address of the source map data, the offset d1 included in the logical address of the host may be converted into d1' (d1'=d1+4 KB), for example, by adding the first size 4 KB to the offset d1 of the host and when the host requests an access to the logical address of the victim map data, the offset d1 included in the logical address of the host may be applied as it is (d1'=d1) without the conversion process, but this is not limited thereto.

In another embodiment, when the error above the first threshold value TH1 occurs in a map table address MTAb−1 region of the initial map table 904A, the controller 110 may merge the map data of the map table address MTAb−1 region with the map data of a following logical address LBAb subsequent to a logical address LBAb−1 corresponding to the map table address MTAb−1. Accordingly, because the source map data is merged with the following logical address LBAb, the controller 110 may set the meta information for the map table address MTAb in which an error occurs to "10" as shown in the resulting map table 904B. The controller 110 may read out data DATAd of a region indicated by the source physical address PAd and data DATAb of a region indicated by a victim physical address PAb (S205) and move the data DATAd and DATAb to target regions starting at physical address PAy of the storage 120, which target regions are physically contiguous to each other (S207).

As the map data are merged, the merged logical address of the logical addresses LBAb−1 and LBAb may be set to the victim logical address LBAb. Then, when an access request to the logical address LBAb−1 is received, the controller 110 may acquire the physical address PAy from a region of the resulting map table 904B indicated by the map table address MTAb allocated to the merged logical address LBAb based on the meta information "10" of the map table address MTAb−1 and access a corresponding region of the storage 120 by converting an offset d2 included in the logical address of the host into d2'. For example, in an embodiment the controller 110 may determine the map table address MTAb−1 from the logical address LBAb−1, determine from the meta-information corresponding to the map table address MTAb−1 that the region of the resulting map table 904B corresponding to the map table address MTAb−1 has been merged into the region of the resulting map table 904B indicated by the map table address MTAb (that is, the following region), acquire a merged physical address PAy from the region of the resulting map table 904B indicated by the map table address MTAb, and determine the physical address corresponding to the logical address LBAb−1 by adding an offset d2' derived from an offset d2 associated with the logical address LBAb−1 to the merged physical address PAy.

When the source map data is merged with the map data of the following logical address and the host requests an access to the logical address of the source map data, the offset d2 included in the logical address of the host may be converted into d2' (d2'=d2+4 KB), for example, by adding the first size 4 KB to the offset d2 of the host, and when the host requests an access to the logical address of the victim map data, the offset d2 included in the logical address of the host may be applied as it is (d2'=d2) without the conversion process, but embodiments are not limited thereto.

Accordingly, the controller 110 may determine the merged state of the map data stored in the corresponding map table address based on the meta information corresponding to the map table address acquired from the logical address provided from the host and then acquire the physical address to be accessed to the storage 120 from the original map data or the merged map data.

Figure 10:
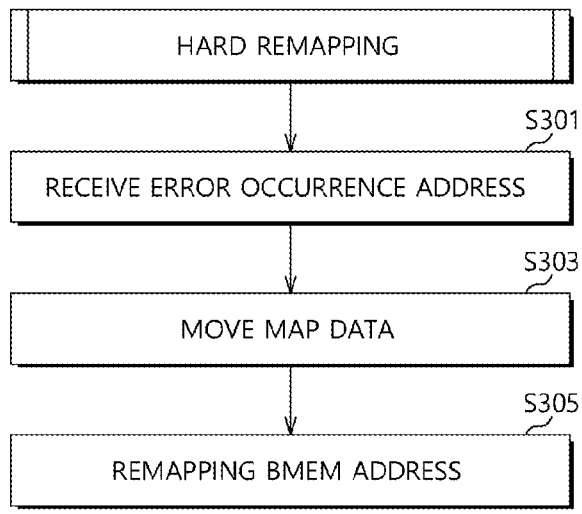
FIG. 10 illustrates a hard remapping process according to embodiments of the present disclosure.

FIG. 10 is a flowchart explaining a hard remapping process according to an embodiment.

The controller 110 may count the number of occurrences of errors for each column of the map data region in which an error occurs when reading out the map data and perform hard remapping on a column in which the number of occurrences of errors is equal to or greater than the second threshold value TH2.

To perform the hard remapping, the BMEM controller 220 may receive a column address in which an error above the second threshold value occurs (S301) and move data of the corresponding column to a redundancy column (S303).

The BMRM controller 220 may remap the column address within the map table address corresponding to the error occurrence column address to instead refer to the redundancy column address to which the data of the error occurrence column was moved (S305).

Then, when the mapping information manager 210 accesses the map table of the buffer memory 130, the BMEM controller 220 may control the mapping information manager 210 to access the buffer memory 130 based on the column address remapping information.

Figure 11:
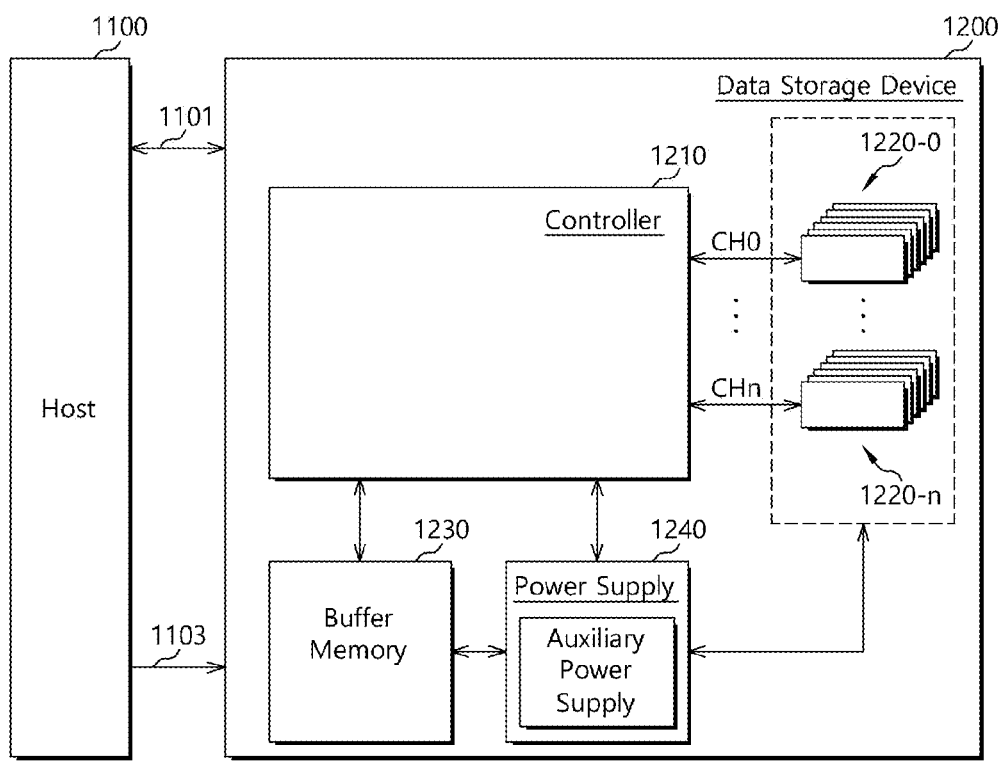
FIG. 11 illustrates a data storage system in accordance with an embodiment.

FIG. 11 is a diagram illustrating a data storage system 1000, in accordance with an embodiment.

Referring to FIG. 11, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a controller, a random access memory used as a working memory, an error check and correction (ECC) component, and a memory interface. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 12:
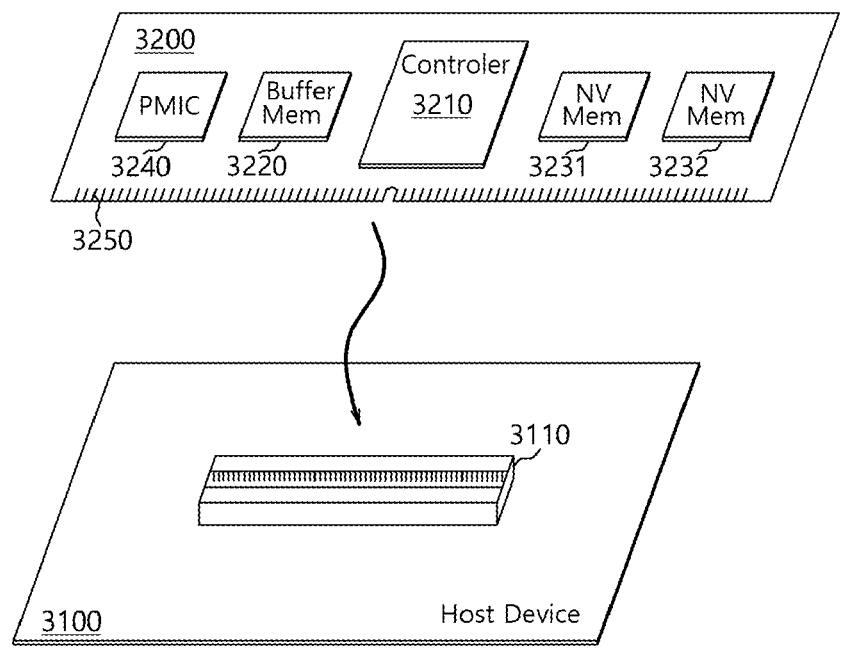
FIG. 12 and FIG. 13 illustrate respective data processing systems in accordance with an embodiment.

FIG. 12 is a diagram illustrating a data processing system 3000, in accordance with an embodiment. Referring to FIG. 12, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 13:
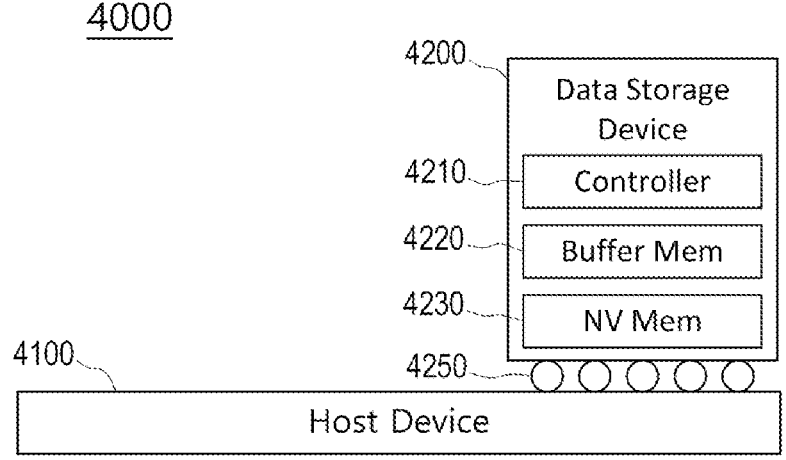

FIG. 13 is a diagram illustrating a data processing system 4000 in accordance with an embodiment. Referring to FIG. 13, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 14:
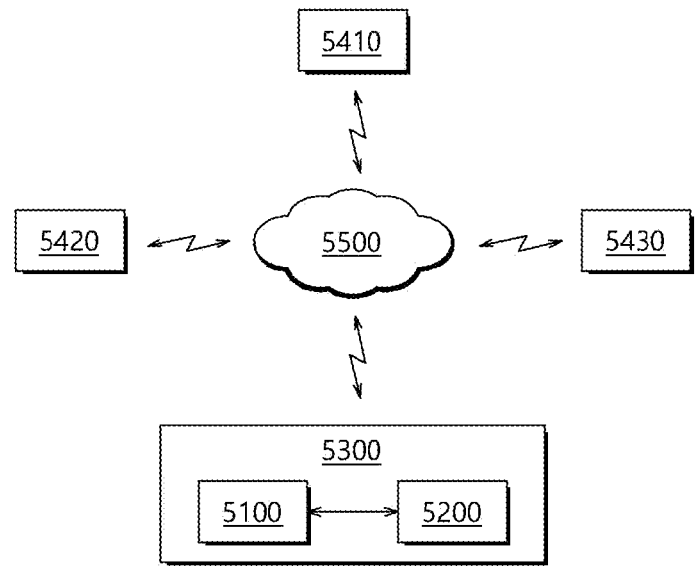
FIG. 14 illustrates a network system including a data storage device in accordance with an embodiment.

FIG. 14 is a diagram illustrating a network system 5000 including a data storage device, in accordance with an embodiment. Referring to FIG. 14, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 11, the memory system 3200 shown in FIG. 12, or the memory system 4200 shown in FIG. 13.

Figure 15:
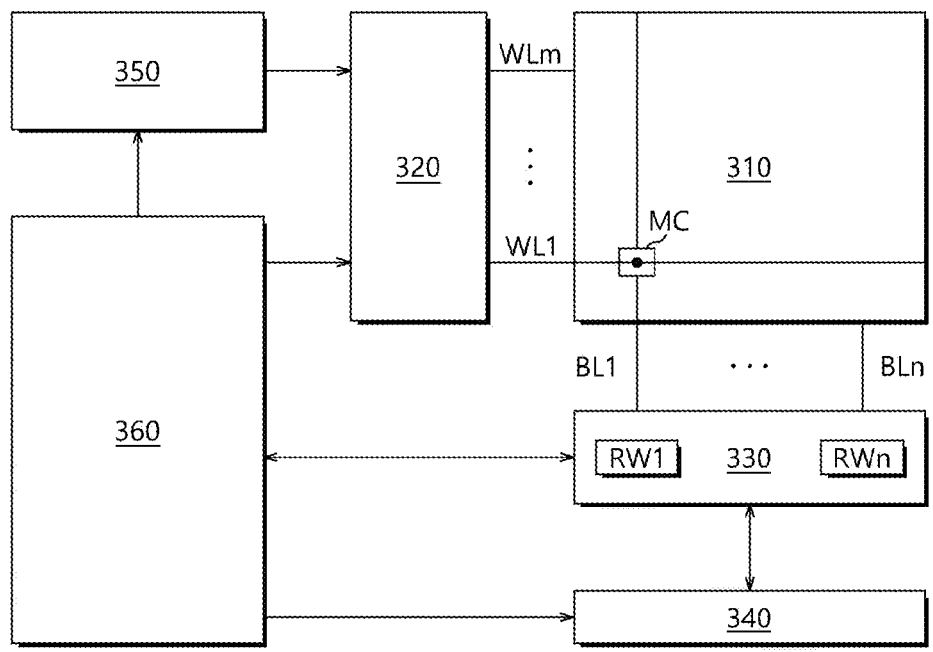
FIG. 15 illustrates a nonvolatile memory device included in a data storage device in accordance with an embodiment.

FIG. 15 is a block diagram illustrating a nonvolatile memory device 300 included in a data storage device, such as the data storage device 10, in accordance with an embodiment. Referring to FIG. 15, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular directionality to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:
1. A data storage apparatus comprising:
   storage that is divided into unit physical regions of a first size and data is stored therein;
   a buffer memory including a plurality of buffer memory regions and having a map table loaded in the plurality of buffer memory regions, the map table including a set of map data, each map data indicating connection information between a logical address of a host and a start physical addresses for a respective unit physical region; and a controller configured to:
control data input and output to and from the storage according to a request of the host,
read, based on a map table address in which map data for a logical address requested to be accessed by the host is stored, map data from the buffer memory, and
remap the map data by merging source map data of a buffer memory region in which a number of occurrences of errors is equal to or greater than a first threshold value with victim map data of at least one buffer memory region in which the number of occurrences of errors is less than the first threshold value.

2. The data storage apparatus of claim 1, wherein the controller selects map data stored in the buffer memory region in which the number of occurrences of errors is equal to or greater than the first threshold value as the source map data, selects N (wherein, N is a natural number) map data of which logical addresses are continuous with a logical address of the source map data as the victim map data, and generates merged map data which is connection information between a merged logical address which is any one of the logical addresses of the victim map data and a start physical address for a physical region of (N+1) times the first size.

3. The data storage apparatus of claim 2, wherein the controller is further configured to select a most preceding logical address of the logical addresses of the victim map data as the merged logical address.

4. The data storage apparatus of claim 1, wherein the controller is further configured to manage a merged state for the source map data as meta information.

5. The data storage apparatus of claim 4, wherein the controller is further configured to:
select map data of a preceding logical address consecutive to a logical address of the source map data as the victim map data and merges the source map data and the victim map data, and
set the meta information to indicate that the source map data is merged with the map data of the preceding logical address.

6. The data storage apparatus of claim 4, wherein the controller is further configured to:
select map data of a following logical address consecutive to a logical address of the source map data as the victim map data and merges the source map data and the victim map data, and
set the meta information to indicate that the source map data is merged with the map data of the following logical address.

7. The data storage apparatus of claim 1, wherein the controller is further configured to:
generate merged map data by merging the source map data with at least one piece of victim map data, and
when a region of the storage corresponding to a physical address indicated by the source map data and region of the storage corresponding to a physical address indicated by the victim map data are contiguous, generate victim map data of a most preceding logical address of logical addresses of the victim map data as the merged map data.

8. The data storage apparatus of claim 1, wherein the controller is further configured to:
generates merged map data by merging the source map data with at least one piece of victim map data, and when a region of the storage corresponding to a physical address indicated by the source map data and a region of the storage corresponding to a physical address indicated by the victim map data are not contiguous, move data stored in the region of the storage corresponding to the physical address indicated by the source map data and data stored in the region of the storage corresponding to the physical address indicated by the victim map data to target regions of the storage which are contiguous and generate the merged map data by mapping a merged logical address which is a most preceding logical address out of logical addresses of the victim map data with a start physical address of the target regions.

9. The data storage apparatus of claim 1, further comprising a buffer memory controller configured to control the buffer memory,
wherein the controller is configured to control the buffer memory controller to move data of a column in which a number of occurrences of errors above a second threshold value occurs to a redundancy column of the buffer memory based on the number of occurrences of errors for each column of the buffer memory stored with the map data, and remap the map table address based on an error occurrence column address and a redundancy column address.

10. An operating method of a data storage apparatus which includes storage which is divided into unit physical regions of a first size and data is stored therein, a buffer memory including a plurality of buffer memory regions and having a map table loaded in the plurality of buffer memory regions, the map table including a set of map data, each map data indicating connection information between a logical address of a and a start physical address for a respective unit physical region, and a controller configured to control data input and output to and from the storage according to requests of a host, the method comprising:
receive a request including the logical address from the host,
read, by the controller and based on a map table address corresponding to the logical address, map data for the logical address from the buffer memory; and
when a number of occurrences of errors of a buffer memory region in which the map data is stored is equal to or greater than a first threshold value, remapping, by the controller, the map data by merging source map data of the buffer memory region in which the number of occurrences of errors is equal to or greater than the first threshold value with victim map data of at least one buffer memory region in which the number of occurrences of errors is less than the first threshold value.

11. The method of claim 10, wherein the remapping includes:
selecting the map data stored in the buffer memory region in which the number of occurrences of errors is equal to or greater than the first threshold value as the source map data;
selecting N (wherein, N is a natural number) map data of which logical addresses are continuous with a logical address of the source map data as the victim map data; and
generating merged map data which is connection information between a merged logical address which is any one of the logical addresses of the victim map data and a start physical address for a physical region of (N+1) times the first size.

12. The method of claim 11, wherein the generating of the merged map data includes selecting a most preceding logical address of the logical addresses of the victim map data as the merged logical address.

13. The method of claim 10, wherein the remapping includes setting a merged state for the source map data as meta information.

14. The method of claim 13, wherein the remapping includes:
   selecting map data of at least one preceding logical address consecutive to a logical address of the source map data as the victim map data; and
   merging the source map data and the victim map data, and wherein setting the meta information includes setting the meta information to indicate that the source map data is merged with the map data of the preceding logical address.

15. The method of claim 13, wherein the remapping includes:
   selecting map data of at least one following logical address consecutive to a logical address of the source map data as the victim map data; and
   merging the source map data and the victim map data, and wherein setting the meta information includes setting the meta information to indicate that the source map data is merged with the map data of the following logical address.

16. The method of claim 10, wherein the remapping further includes:
   when a region of the storage corresponding to a physical address indicated by the source map data and a region of the storage corresponding to a physical address indicated by the victim map data are contiguous, generating victim map data of a most preceding logical address out of logical addresses of the victim map data as the merged map data.

17. The method of claim 10, wherein the remapping includes:
   when a region of the storage corresponding to a physical address indicated by the source map data and a region of the storage corresponding to a physical address indicated by the victim map data are not contiguous:
      moving data stored in the region of the storage corresponding to the physical address indicated by the source map data and data stored in the region of the storage corresponding to the physical address indicated by the victim map data to target regions of the storage which are contiguous, and
      generating merged map data by a merged logical address which is a most preceding logical address of logical addresses of the victim map data with a start physical address out of the target regions.

18. The method of claim 10, wherein the data storage apparatus further includes a buffer memory controller configured to control the buffer memory, and wherein the remapping includes:
   counting, by the controller, the number of occurrences of errors for each column of the buffer memory used to store the map data;
   moving, by the buffer memory controller, data of a column in which an error count above a second threshold value occurs to a redundancy column of the buffer memory according to control of the controller; and
   remapping, the buffer memory controller, the map table address based on an error occurrence column address and a redundancy column address.

* * * * *